(12) United States Patent  
Dubus et al.

(10) Patent No.: US 7,044,012 B2  
(45) Date of Patent: May 16, 2006

(54) ACTUATING DEVICE WITH INTERMEDIATE ROLLING ELEMENTS

(75) Inventors: Jerome Dubus, La Motte Servolex (FR); Christian Boch, Chambery (FR); Peter K. Hayward, Buckinghamshire (GB)

(73) Assignee: Transrol, Chambery (FR)

( * ) Notice: Subject to any disclaimer, the term of this patent is extended or adjusted under 35 U.S.C. 154(b) by 375 days.

(21) Appl. No.: 10/420,006

(22) Filed: Apr. 22, 2003

(65) Prior Publication Data

US 2004/0069084 A1 Apr. 15, 2004

(30) Foreign Application Priority Data

Apr. 24, 2002 (FR) .................................. 02 05136

(51) Int. Cl.
*F16H 27/02* (2006.01)

(52) U.S. Cl. .................................. 74/89.35; 74/424.92

(58) Field of Classification Search ............... 74/89.35, 74/424.92

See application file for complete search history.

(56) References Cited

U.S. PATENT DOCUMENTS

| 4,050,319 A | * | 9/1977 | Stanley | 74/424.92 |
| 4,576,057 A | * | 3/1986 | Saari | 74/424.92 |
| 5,358,265 A | * | 10/1994 | Yaple | 280/293 |
| 5,370,012 A | * | 12/1994 | Stanley | 74/424.92 |
| 5,836,208 A | * | 11/1998 | Dietrich et al. | 74/424.92 |
| 5,848,554 A | | 12/1998 | Kober et al. | 74/424.8 |
| 6,234,034 B1 | | 5/2001 | Ando | 74/89.15 |

FOREIGN PATENT DOCUMENTS

| DE | 197 11 773 | 9/1998 |
| DE | 199 03 718 | 6/2000 |

* cited by examiner

*Primary Examiner*—David Fenstermacher  
(74) *Attorney, Agent, or Firm*—Smith Gambrell & Russell LLP

(57) ABSTRACT

Actuating device comprising a longitudinal shaft (2), an intermediate tailstock spindle (3), an outside sleeve (4), internal thread means (5) making it possible to connect the longitudinal shaft and the intermediate tailstock spindle to generate an axial movement of one with respect to the other, external thread means (6) making it possible to couple the intermediate tailstock spindle and the outside sleeve and suitable for generating an axial movement of one with respect to the other, the said internal coupling means comprising internal roller elements (7) engaged on the one hand with the external and internal threads of the intermediate tailstock spindle and/or the said external coupling means comprising external roller elements (25) engaged on the one hand with the external thread of the intermediate tailstock spindle and the internal thread of the outside sleeve and comprising coupling means making it possible to couple the shaft and the intermediate tailstock spindle or the intermediate tailstock spindle and the internal thread of the outside sleeve selectively while rotating.

26 Claims, 12 Drawing Sheets

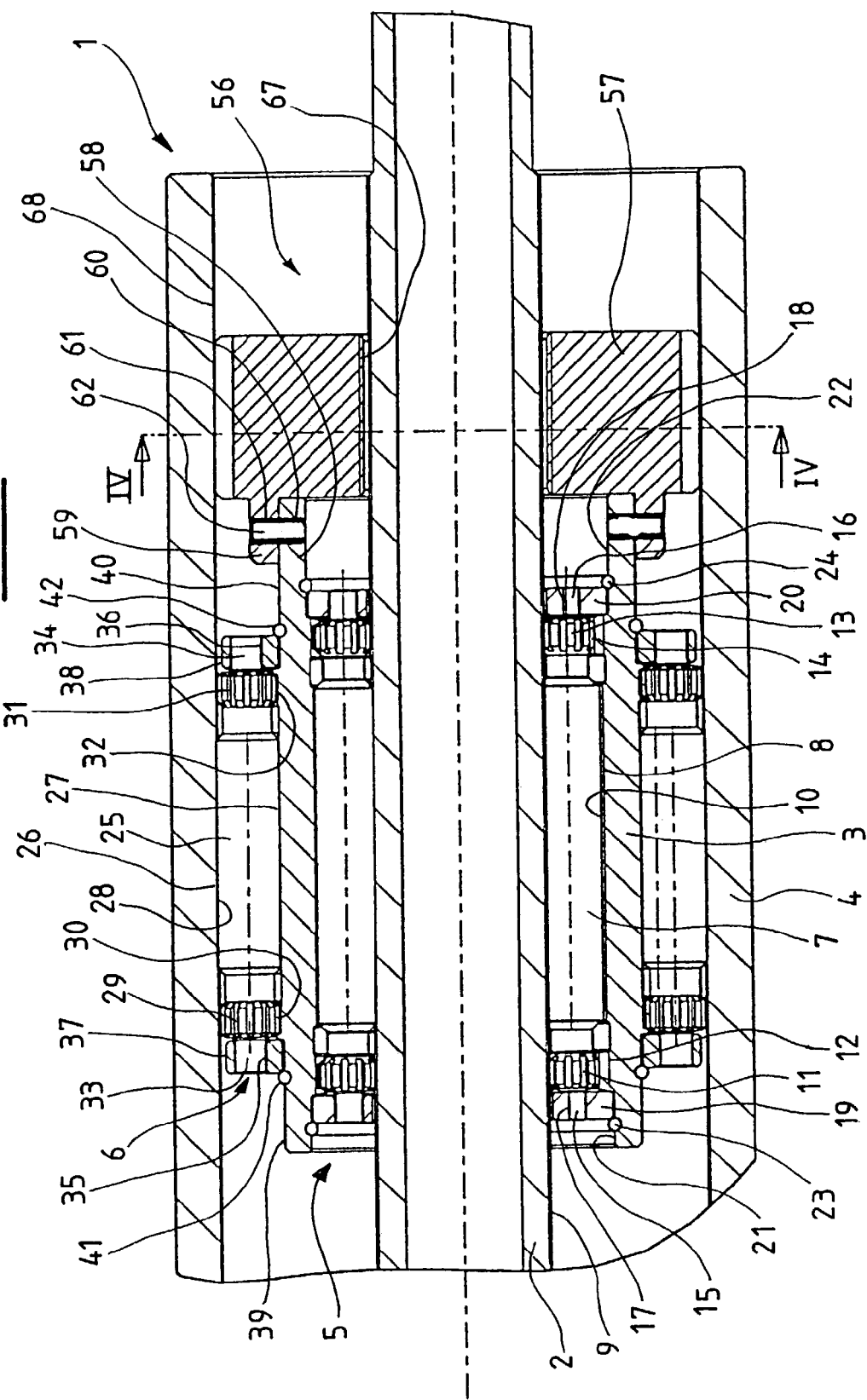
FIG_1

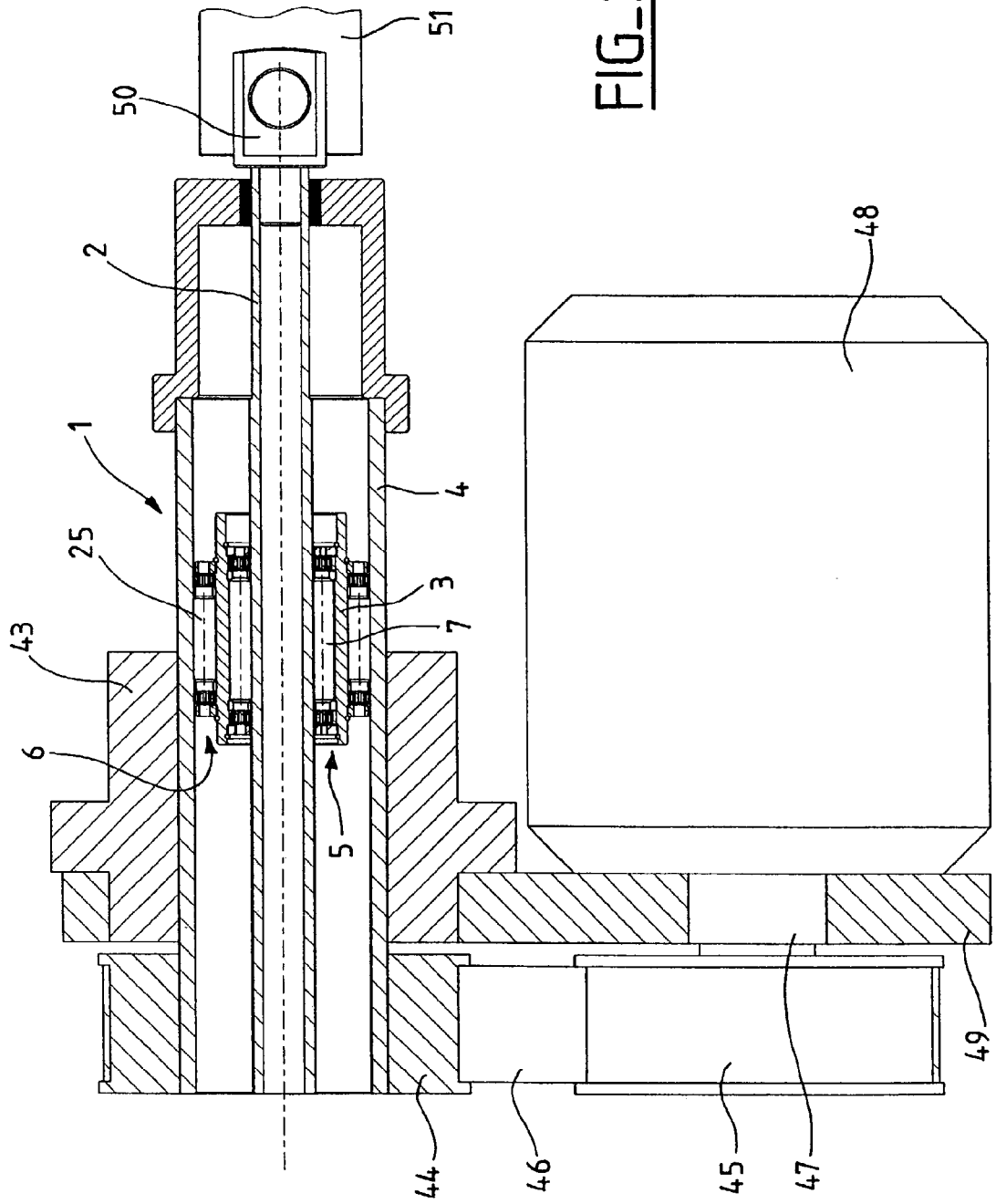
FIG_2

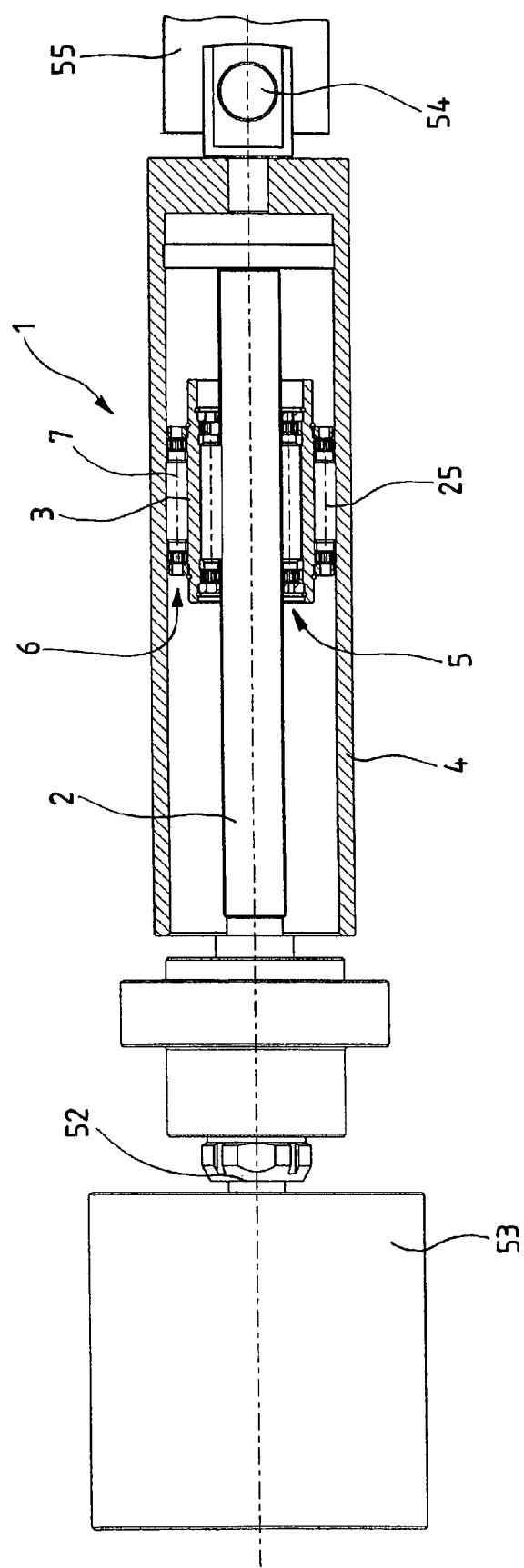
FIG_3

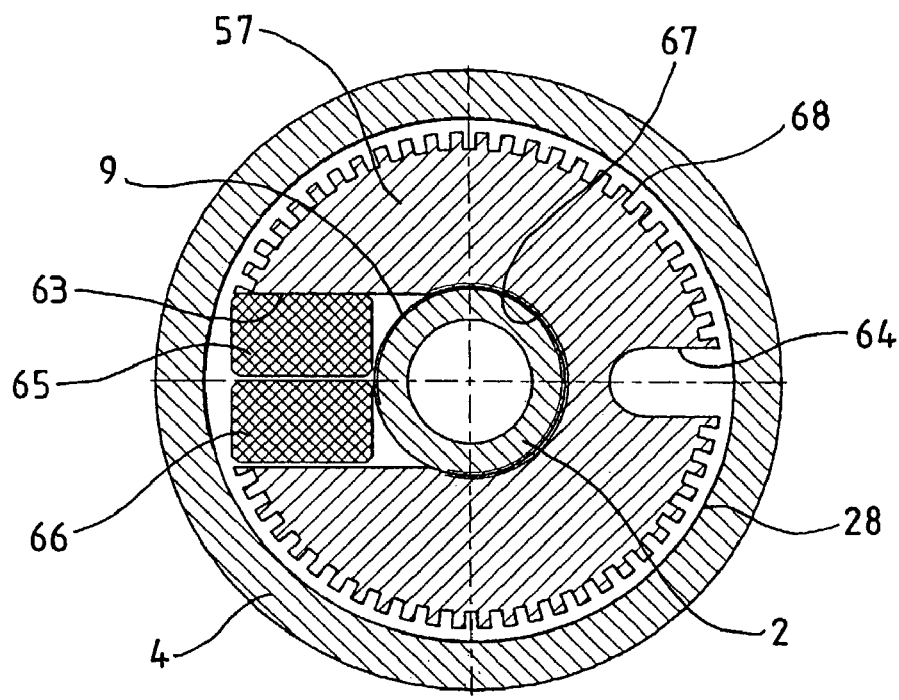
FIG_4
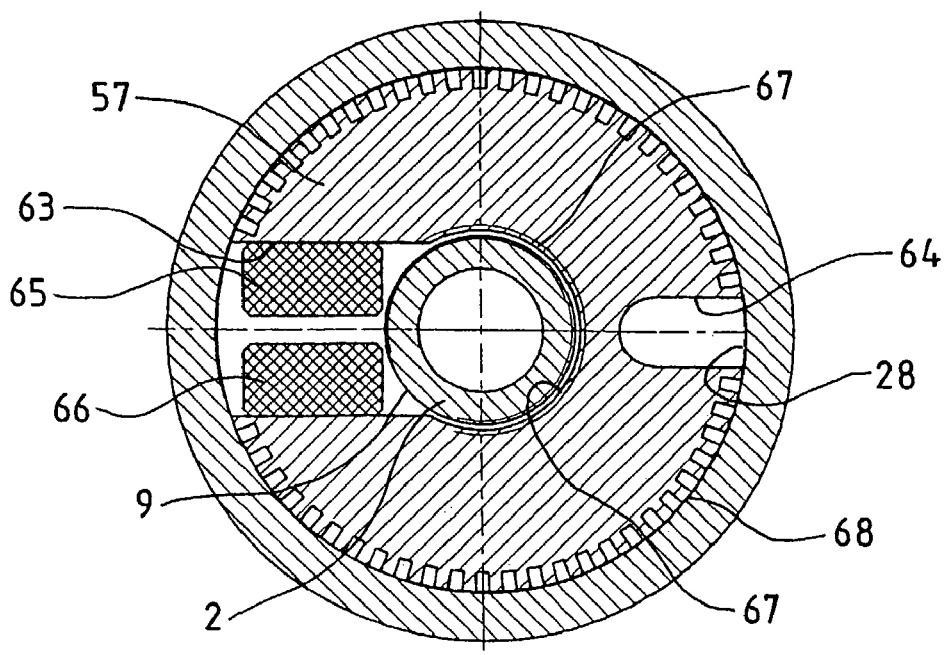
FIG_5

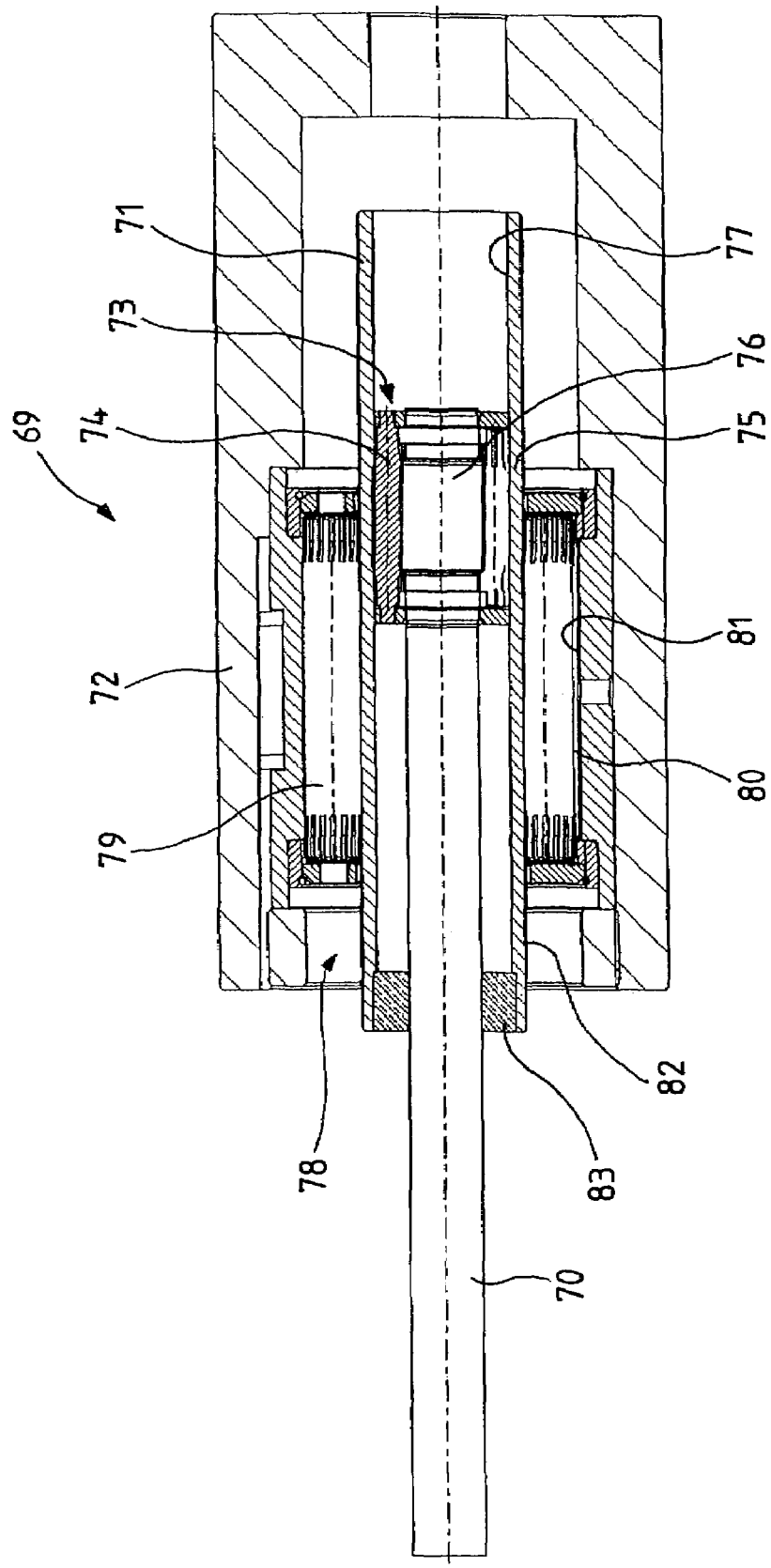
FIG_6

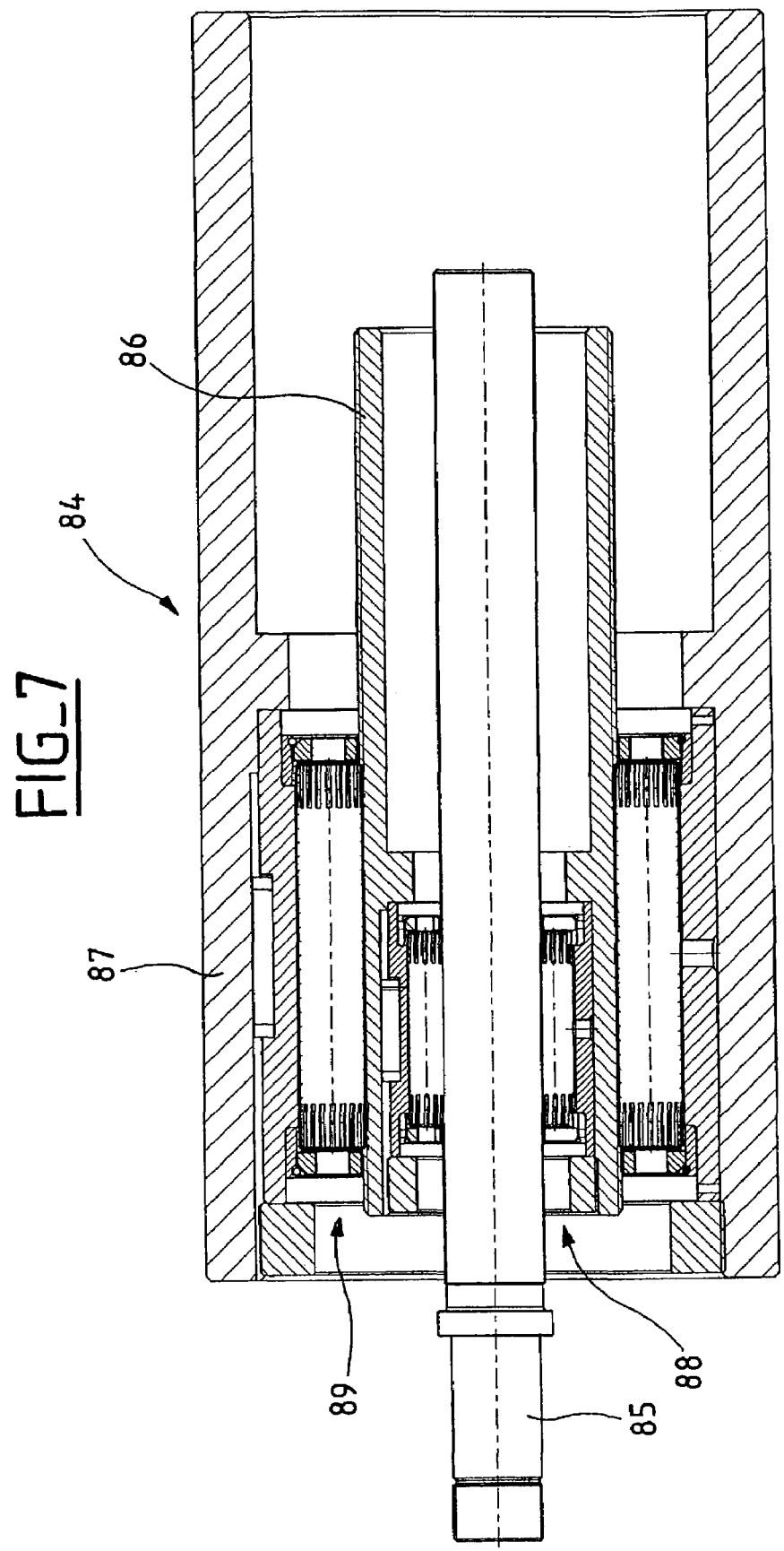

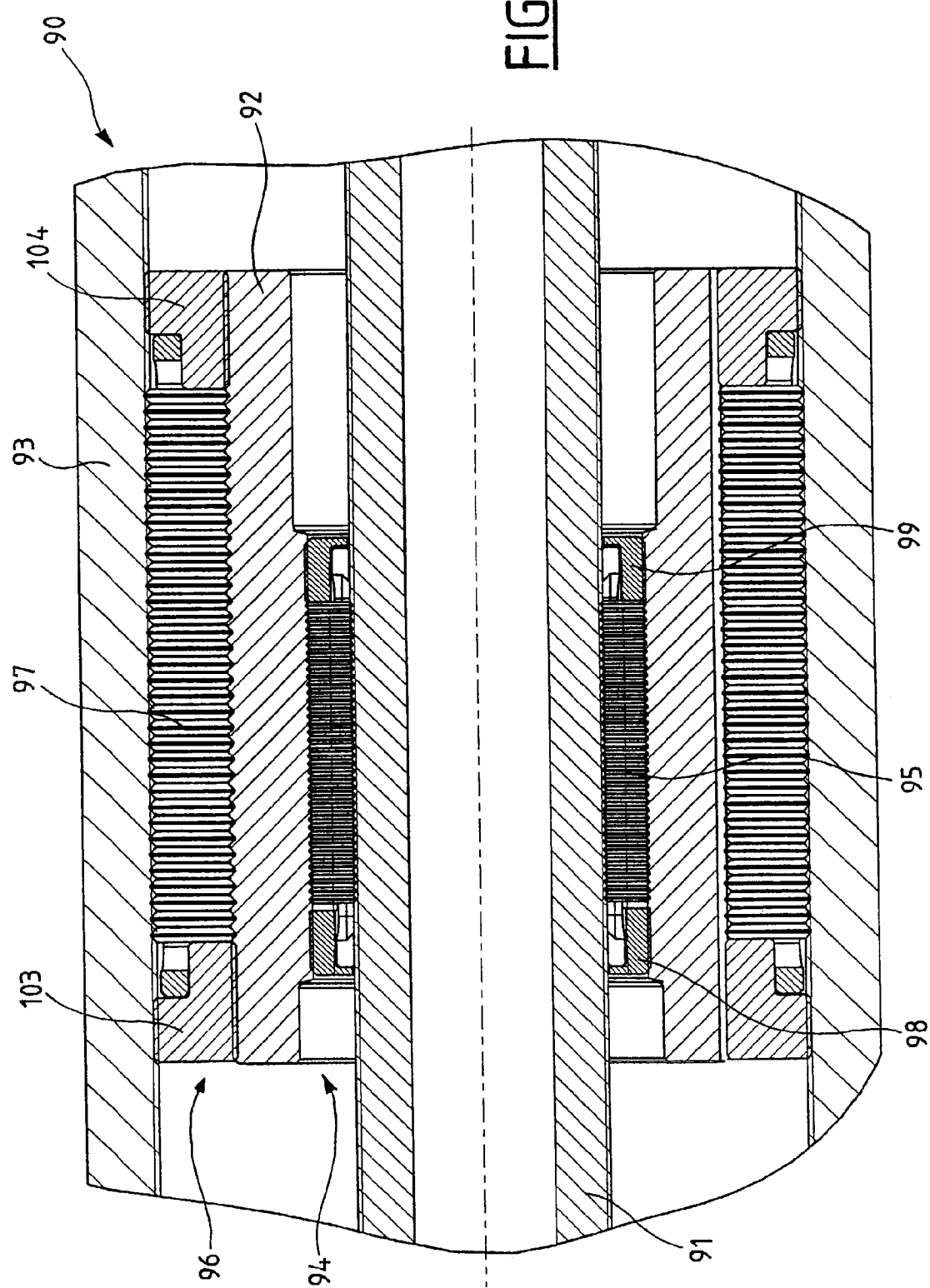
FIG_8a

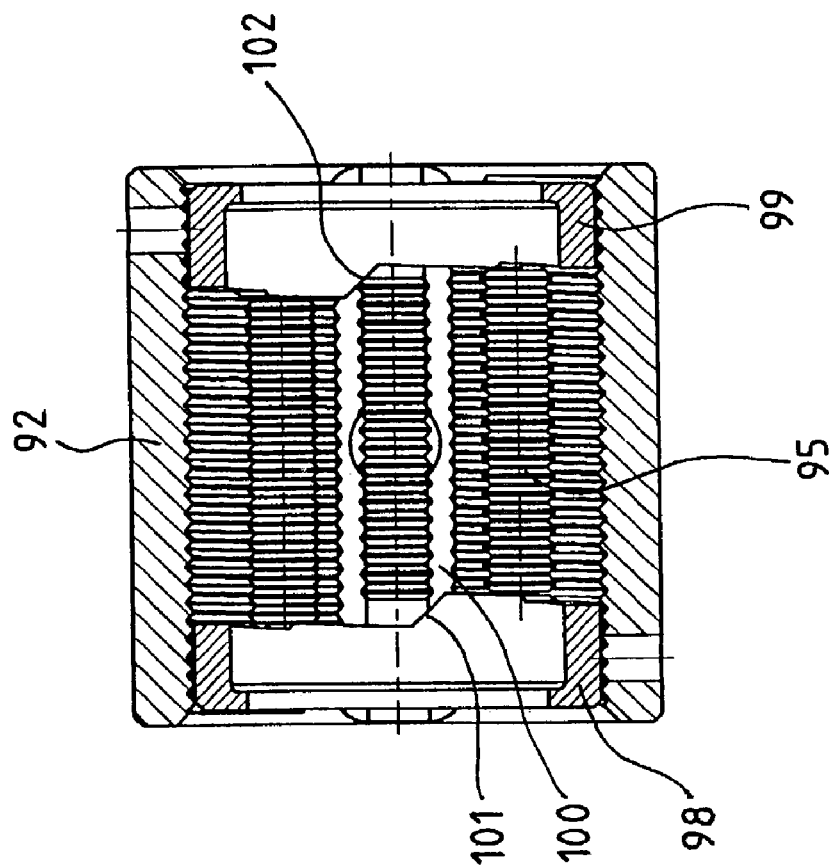
FIG_8b
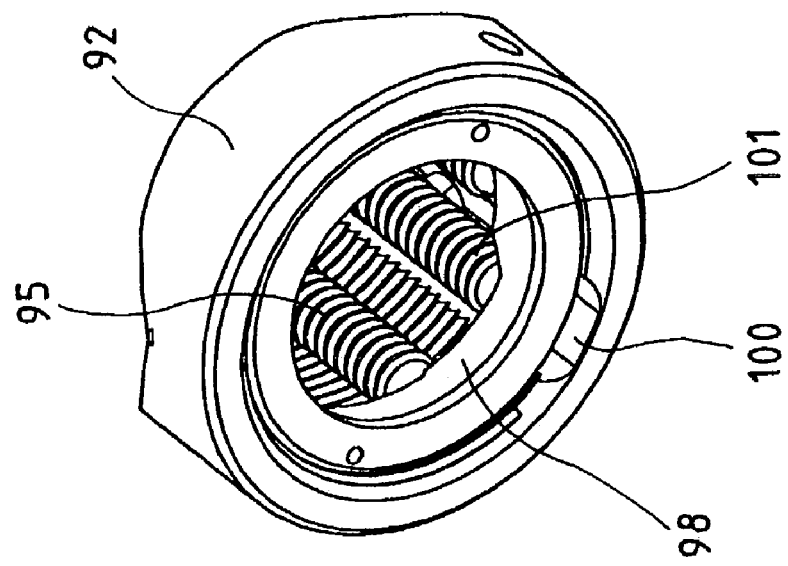
FIG_8c

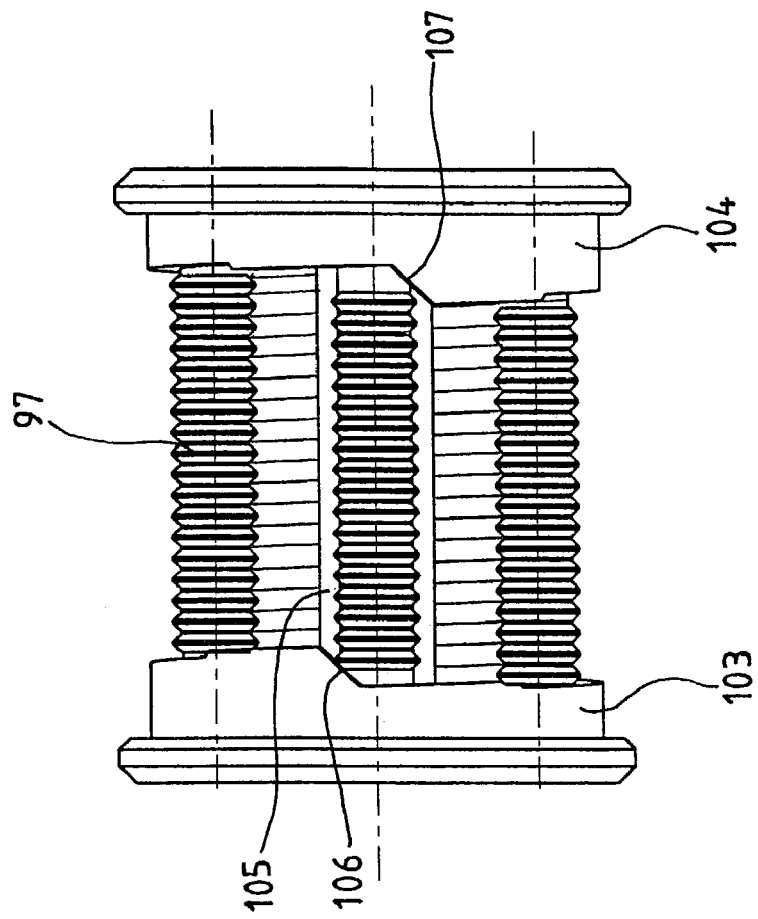
FIG_8d
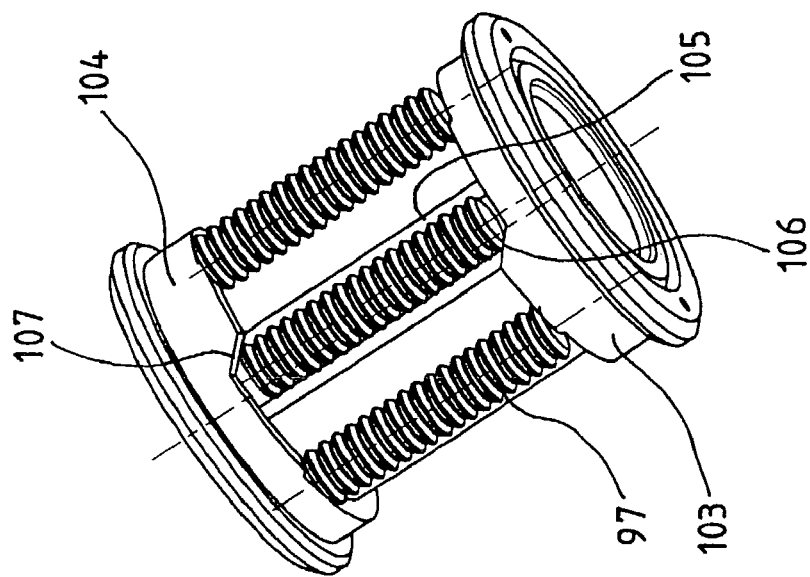
FIG_8e

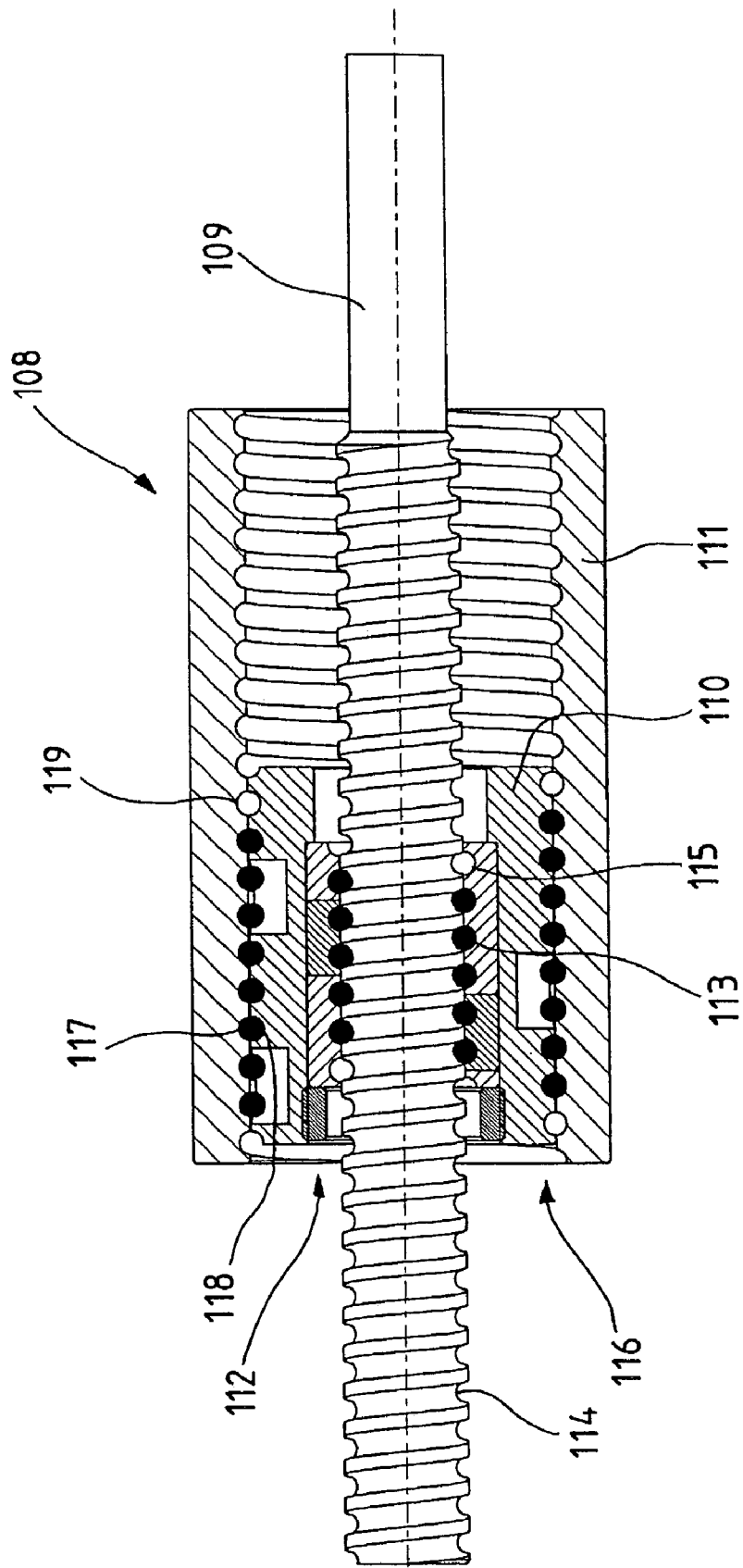
FIG_9a

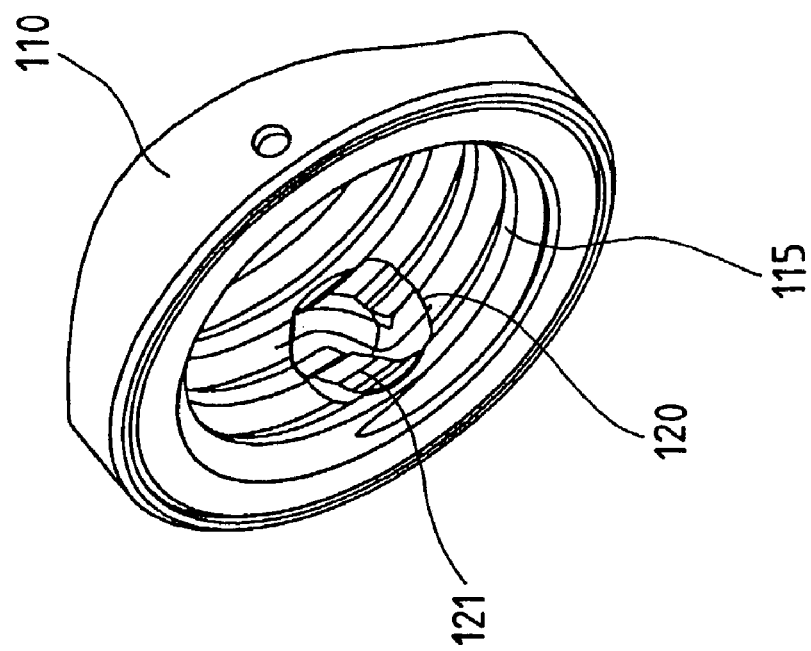
FIG_9b
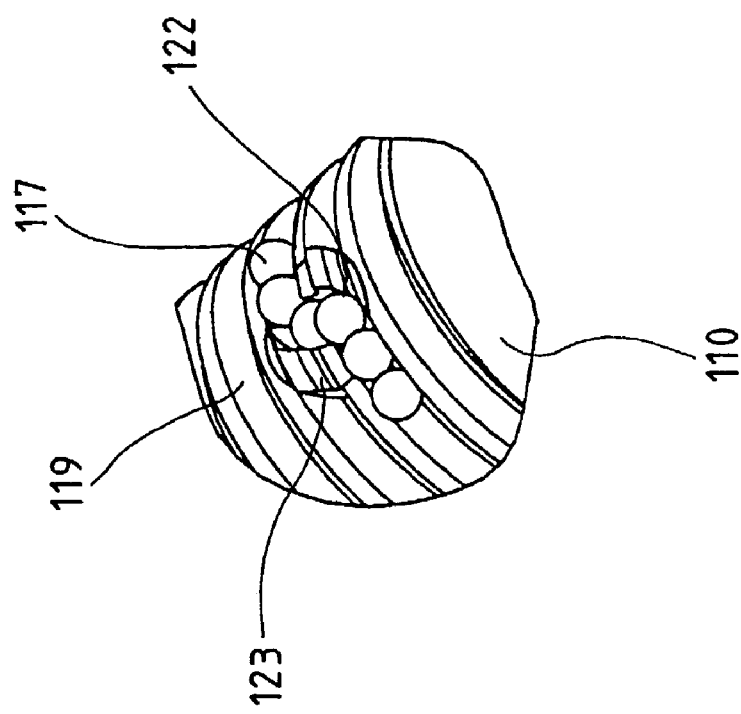
FIG_9c

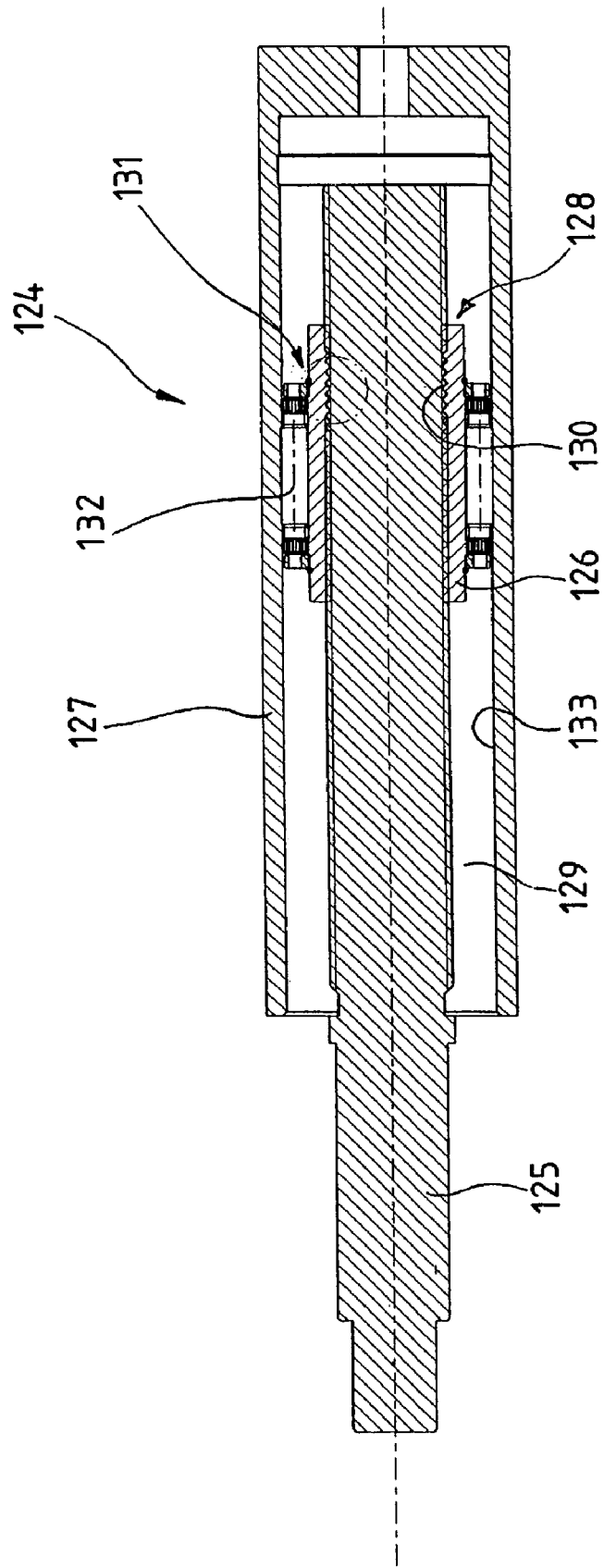
FIG_10

ACTUATING DEVICE WITH INTERMEDIATE ROLLING ELEMENTS

This invention relates to the scope of actuating devices making it possible to move at least two parts, with respect to each other, of an instrumentation system or of a machine in one direction.

Nut and bolt type actuating devices are widely known whose threads are directly or indirectly connected by means of rolling elements, such as bearings or rollers. When the bolt is driven so that it rotates around the bolt, or vice versa, the shaft or the nut moves with respect to each other according to their longitudinal direction, generating a relative shift of the parts to be actuated.

It may be that the operating condition of the operating devices above deteriorates up to a point that the drive coupling is no longer able to produce the actuation of the said parts, with the most adverse situation producing a total blockage of the actuating device.

In the event that the parts to be actuated belong to an apparatus or to a machine whose operation or use incurs risks and the deterioration of the above-mentioned actuating devices constitutes a major inconvenience.

The objective of this invention is to propose an actuating device that would, in particular, allow a reduction of such risks.

The actuating device according to the invention comprises the following: a longitudinal shaft, an intermediate tailstock spindle positioned coaxially to and around the said shaft, an outside sleeve positioned coaxially to the said shaft and around the said intermediate tailstock spindle, with internal threading means making it possible to connect the longitudinal shaft and the intermediate tailstock spindle and suitable for generating an axial movement of one with respect to the other, external threading means making it possible to connect the intermediate tailstock spindle and the outside sleeve and suitable for generating an axial movement of one with respect to the other, with the said internal coupling means comprising internal rolling elements engaged on the one hand with the external and internal threading of the intermediate tailstock spindle and/or the said external coupling means comprising external rolling elements engaged on the one hand with the external threading of the intermediate tailstock spindle and the internal threading of the outside sleeve.

According to the invention, the actuating device may advantageously comprise coupling means making it possible to selectively connect the shaft and the intermediate tailstock spindle or the intermediate tailstock spindle and the internal threading of the outside sleeve while rotating.

According to the invention, the said coupling means are preferably such that, for a given axial load to be transmitted, one of the said coupling means operates and the second does not operate or is blocked and that, when the input torque or motor, applied to the shaft, exceeds a preset threshold determined on the basis of the load to be transmitted, the said second of the said coupling means operates and the said first of these coupling means does not operate or is blocked.

According to the invention, the said internal coupling means may advantageously comprise the said internal rolling elements and the said external coupling means may advantageously comprise an external threading of the intermediate tailstock spindle and an internal threading of the outside sleeve engaged with each other.

According to the invention, the said internal coupling means may advantageously comprise the said internal rolling elements and the said external coupling means may advantageously comprise an external threading of the intermediate tailstock spindle and an external threading of the longitudinal shaft and an internal threading of the intermediate tailstock spindle engaged with each other.

According to the invention, the said internal coupling means may advantageously comprise the said internal rolling elements and the said external coupling means may advantageously comprise the said external rolling elements.

According to the invention, the internal rolling elements and the said external coupling means may advantageously comprise the external rolling elements.

According to the invention, the internal rolling elements and/or the external rolling elements may advantageously comprise the bearings arranged between the internal and external threads, the means for recycling or repositioning these having been provided.

According to the invention, the intermediate tailstock spindle preferably comprises the said means to recycle or reposition the said bearings.

According to the invention, the internal rolling elements and/or the external rolling elements may advantageously comprise the longitudinally threaded rollers engaged with the internal and external threads, the means for recycling or repositioning these rollers having been provided.

According to the invention, the intermediate tailstock spindle preferably comprises the said means for recycling or repositioning the said rollers.

According to the invention, the internal rolling elements may advantageously comprise the longitudinally thread rollers, the helix angle of the threading of the rollers being either equal to the helix angle of the threading of the shaft and different from the helix angle of the internal threading of the intermediate tailstock spindle or equal to the helix angle of the internal threading of the intermediate tailstock spindle and different from the helix angle of the threading of the shaft.

According to the invention, the internal rollers may advantageously comprise at least one annular section with gear teeth that are engaged either with the gear teeth of the shaft or with the gear teeth of the intermediate tailstock spindle.

According to the invention, the device may advantageously comprises ferules positioned around the said internal rollers and has longitudinal holes in which the ends of these rollers and the means for forming axial end stops for the said bushes are respectively engaged.

According to the invention, the external coupling means may advantageously comprise threaded longitudinal rollers, the helix angle of the threading of the rollers being either equal to the helix angle of the internal threading of the outside sleeve and different from the helix angle of the external threading of the intermediate tailstock spindle or equal to the helix angle of the external threading of the intermediate tailstock spindle and different from the helix angle of the internal threading of the outside sleeve.

According to the invention, the external rollers may advantageously comprise at least one annular section with gear teeth that are engaged with the gear teeth that are engaged with the gear teeth of the intermediate tailstock spindle.

According to the invention, the device may advantageously comprise external bushes positioned around the said external rollers and has longitudinal holes in which the ends of these rollers and the means for forming axial end stops for the said bushes are respectively engaged.

According to the invention, the internal rolling elements may advantageously comprise longitudinally threaded rollers, the helix angle of the being equal to the helix angle of the internal threading of the intermediate tailstock spindle and different from the helix angle of the threading of the shaft.

According to the invention, the external rolling elements may advantageously comprise longitudinally threaded rollers, the helix angle of the threading of the rollers being equal to the helix angle of the external threading of the intermediate tailstock spindle and different from the helix angle of the internal threading of the outside sleeve.

According to the invention, the internal rollers may advantageously comprise at least one annular section with gear teeth that are engaged with the gear teeth of the intermediate tailstock spindle and the external rollers may advantageously comprise at least one annular section with gear teeth that are engaged with the gear teeth of the intermediate tailstock spindle.

According to the invention, the device preferably comprises bushes positioned around the said internal rollers and has longitudinal holes in which the ends of these rollers and means for forming axial end stops for the said bushes, as well as for the bushes positioned around the external rollers and has longitudinal holes in which the ends of these rollers and the means for forming axial end stops for the said bushes are respectively engaged.

According to the invention, the said coupling means may advantageously comprises the coupling, making it possible to selectively block in rotation either the shaft and the intermediate tailstock spindle, or the intermediate tailstock spindle and the outside sleeve and the control mechanism of these coupling means.

According to the invention, the said coupling means may advantageously comprise a radially malleable ring, connected in rotation to the intermediate tailstock spindle and means acting on this ring to selectively bring it against the inner wall of the outside sleeve or against the outer wall of the shaft.

According to the invention, the said control mechanism may advantageously comprise means for detecting the coupling and/or means for detecting rotation and/or means for detecting the axial load and/or means for detecting relative axial movement, as well as means for activating the said coupling means when the signal issuing by this means of detection passes a predetermined threshold.

According to the invention, the said coupling means may advantageously consist of relative differences between the helix angle of the threadings of the shaft, of the intermediate tailstock spindle and of the outside sleeve and/or relative differences between the threading configuration of the shaft, of the intermediate tailstock spindle and of the outside sleeve and/or relative differences between the helix angle of the threadings of the shaft, of the intermediate tailstock spindle and of the outside sleeve and/or relative differences between the advance by turns of the threadings of the shaft, of the intermediate tailstock spindle and of the outside sleeve.

According to the invention, the device may advantageously comprise means for guiding the outside sleeve with respect to the said longitudinal and/or means of guiding the intermediate tailstock spindle with respect to the outside sleeve and/or means of guiding the intermediate tailstock spindle with respect to the said longitudinal shaft.

This invention can be better understood by examining the various actuating devices described as open-ended and illustrated by the drawing on which:

FIG. 1 represents a longitudinal section of an actuating device according to the invention.

FIG. 2 represents a longitudinal section of an application of the actuating device in FIG. 1.

FIG. 3 represents a longitudinal section of another application of the actuating device in FIG. 1.

FIG. 4 represents a transversal section according to IV—IV of the actuating device in Figure, in a first position.

FIG. 5 represents the same transversal section of the actuating device in FIG. 1, in a second position.

FIG. 6 represents a longitudinal section of another actuating device according to the invention.

FIG. 7 represents a longitudinal section of another actuating device according to the invention.

FIG. 8a represents a longitudinal section of another actuating device according to the invention.

FIG. 8b represents a partial view within the actuating device in FIG. 8a.

FIG. 8c represents a perspective view of an end portion of the partial view in FIG. 8b.

FIG. 8d represents a longitudinal section of another view within the actuating device in FIG. 8a.

FIG. 8e represents a perspective view of an end portion of the partial view in FIG. 8d.

FIG. 9a represents a longitudinal section of another actuating device according to the invention.

FIG. 9b represents a partial view in perspective within the actuating device in FIG. 9a.

FIG. 9b represents a partial view in perspective of another part within the actuating device in FIG. 9a.

FIG. 9c represents a partial view in perspective of the actuating device in FIG. 9a.

and FIG. 10 represents a longitudinal section of another actuating device according to the invention.

If we refer to FIG. 1, we can see that an actuating device is represented, which comprises a cylindrical longitudinal shaft 2, a cylindrical intermediate tailstock spindle 3 positioned coaxially around and at a distance from the longitudinal shaft 2, and a cylindrical outside sleeve 4, positioned coaxially to the longitudinal shaft 2, around and at a distance of the intermediate tailstock spindle 3.

The actuating device 1 comprises internal coupling means to thread 5, making it possible to connect the longitudinal shaft 2 and the intermediate tailstock spindle 3 and adapted to generate an axial movement between them, as well as external coupling means to thread 6, making it possible to connect the intermediate tailstock spindle 3 and the exterior sleeve 4 and adapted to generate an axial movement between them.

According to the invention in FIG. 1, the internal coupling means 5 comprise, in a manner known in itself, an internal series of longitudinal rollers 7, which are arranged between the longitudinal shaft 2 and the intermediate tailstock spindle 3 and which are distributed peripherally and which have an external thread 8 over a good portion of their length. The threads 8 of the rollers 7 are engaged with an external thread 9 of the longitudinal shaft 2 and an internal thread 10 of the intermediate tailstock spindle 3.

In addition, the rollers 7 have, in their end section, on the one hand a portion with straight gear teeth 11 engaged with gear teeth 12 provided in an internal annular section of the intermediate tailstock spindle 3 and on the other, a section with straight gear teeth 13 engaged with gear teeth 14 provided in an internal annular section of the intermediate tailstock spindle 3.

In this example, on the one hand, the threaded sections 8 and the gear teeth 11 and 13 opposite the rollers 7 are separated by circular grooves and on the other, the threaded section 10 and the gear teeth 12 and 14 opposite the intermediate tailstock spindle 3.

The longitudinal rollers 7 also have opposite back-ends 15 and 16, of reduced diameter, which are engaged in the longitudinal holes 17 and 18 provided in a allocated manner in the retainer clips 19 and 20, engaged in the internal cylindrical back-end sections 21 and 22 of the intermediate tailstock spindle 3, these retainer clips 19 and 20 being retained in the opposite manner by circular rings 23 and 24 installed in the grooves of the cylindrical parts 21 and 22 of the intermediate tailstock spindle 3.

On one part, the threadings 8 of the rollers 7 and the internal thread 10 have identical helix angles and, on the other, the threadings 8 of the rollers 7 and the threading 9 of the longitudinal shaft 2 have different helix angles. Thus, when the longitudinal shaft 2 turns with respect to the intermediate tailstock spindle 3, the rollers 7 turned on themselves and rolled around the longitudinal shaft 2 and into the intermediate tailstock spindle 3, without moving longitudinally with respect to the intermediate tailstock spindle 3 and while generating an axial movement of the longitudinal shaft 2 with respect to the intermediate tailstock spindle 3.

According to the example in FIG. 1, the external coupling means 6 comprise, in a known manner in itself, an external threading of longitudinal rollers 25, which are arranged between the intermediate tailstock spindle 3 and the external shaft 4 and which are allocated peripherally and which have an external thread 26 over a good portion of their length. The threadings 26 of the rollers 25 are engaged with an external thread 27 of the intermediate tailstock spindle 3 and an internal thread 28 of the outside sleeve 4.

In addition, the rollers 25 have, in their back-end, on the one hand, a section with straight gear teeth 29 engaged with the gear teeth 30 in a circular external section of the intermediate tailstock spindle 3, and on the other, a section with straight gear teeth 31 engaged with the gear teeth 32 provided in an external circular part of the intermediate tailstock spindle 4.

In this example, on the one hand, the threaded sections 26 and the gear teeth 29 and 31 opposite the rollers 25 are separated by circular grooves, and, on the other, by the threaded section 27, and the gear teeth 30 and 32 opposite the intermediate tailstock spindle 3 are also separated by circular grooves.

The longitudinal rollers 25 also have opposite back-ends 33 and 34, of reduced diameter, which are engaged in the longitudinal holes 35 and 36, provided in an allocated manner in the retainer clips 37 and 38, engaged in the external back-end cylindrical sections 39 and 40 of the intermediate tailstock spindle 3, these clips being retained in an opposite manner by the circular rings 41 and 42 installed in the grooves of the cylindrical sections 39 and 40 of the intermediate tailstock spindle 3.

On the one hand, the threadings 26 of the rollers 25 and the external thread 27 of the intermediate tailstock spindle 3 have identical helix angles and, on the other, the threadings 26 of the rollers 25 and the threading 28 of the outside sleeve 4 have different helix angles. Thus, when the outside sleeve 4 turns with respect to the intermediate tailstock spindle 3, the rollers 25 pivot and roll around the intermediate tailstock spindle 3 and into the outside sleeve 4, without moving longitudinally with respect to the intermediate tailstock spindle 3 and while generating an axial movement of the intermediate tailstock spindle 3 with respect to the outside sleeve 4.

The longitudinal stroke between the longitudinal shaft 2 and the outside sleeve 4 is defined on the basis of the length of the threading 9 of the longitudinal shaft 2 and/or on the basis of the length of the internal thread 28 of the outside sleeve 4, this stroke depending on the blocked or operating status of the internal coupling means 5 and/or the external coupling means 6.

If we refer to the FIG. 2, we can see that an application of the actuating device 1 in FIG. 1, in which the outside sleeve 4 is carried by a thrust bearing housing and carries a pulley 44 which is connected to a driving pulley 45 by means of a belt 46, the driving pulley being mounted at the end of the driving shaft 47 of a motor 48 carried by a jig carrying the housing 43. One end of the longitudinal shaft 2 has a connector 50 suitable for connecting to a body 51 for moving with respect to the jig 49 and immobilizing the rotation of the longitudinal shaft 2.

If we refer to FIG. 3, we can see another application of the actuating device 1 in FIG. 1 in which, inversely to the application of FIG. 2, one end of the longitudinal shaft 2 is connecting to the driving shaft 52 of a motor 53, aligned with the longitudinal shaft 2, the outside sleeve 4 carrying, opposite the motor 53, a connector 54 suitable for connection to a body 55 for moving with respect to a jig carrying the crankcase of the motor 53 and immobilizing the rotation of the outside sleeve.

The actuating device 1 that has just been described also comprises coupling means that allow selective connection of the longitudinal shaft 2 and the intermediate tailstock spindle 3 in rotation or of the intermediate tailstock spindle 3 and the outside sleeve 4.

In the embodiment illustrated in FIG. 1, complemented by FIGS. 4 and 5, the coupling means consist of coupling means 56 that comprise a ring 57 which is arranged beyond the intermediate tailstock spindle 3, around the longitudinal shaft 2 and within the outside sleeve 4. The intermediate tailstock spindle 3 has a circular extension 58 and the ring 57 has a radial thickness that is slightly lower than the distance separating the longitudinal shaft 2 and the outside sleeve 4. The intermediate tailstock spindle 3 has a circular extension engaged around the extension 58. The extension 58 and the flange 59 each have two corresponding radially opposite portions 60 and 61 in which the radially connecting pins 62 are arranged that are fixed in the portions 60 but loose in the portions 61.

The ring 57 has a longitudinal slot 63 and in a diagonally opposite manner, an external longitudinal recess 64 such that the ring is radially malleable.

In its slot 63, the ring 57 carries electromagnetic elements 65 and 66 that are liable to be activated by unauthorized means.

When the electromagnetic elements 65 and 66 are not activated, the ring 57 is found in a first actuating position in which it inserts and clamps the longitudinal shaft 2 in its internal portion 67, with its peripheral surface 68 thus being at a distance from the inner surface of the outside sleeve 4.

In its first actuating position to which a first operating mode corresponds, the longitudinal shaft 2 and the intermediate tailstock spindle 7 are connected in rotation in such a manner that the internal connection means 5 are blocked or inactive. The relative rotational movement of the longitudinal shaft 2 with respect to the outside sleeve 4 such as arises from, for example, the applications described referring to FIGS. 2 and 3, generating a longitudinal movement of the longitudinal shaft 2 with respect to the outside sleeve 4, is obtained by external coupling means 6, i.e., owing to the threading of external rollers 25.

When the electromagnetic elements 65 and 66 are activated, the ring 57 is located in a second actuating position in which the ring 57 is radially distorted toward the outside, in such a manner that its peripheral surface 68 is in contact with the internal of the outside sleeve 4, its internal portion 67 thus being at a distance from the longitudinal shaft 2.

In this second driving position to which a second operating mode corresponds, the intermediate tailstock spindle 3 and the outside sleeve 4 are connected while rotating in such a manner that the external coupling means are blocked or inactive. The relative rotational movement of the longitudinal shaft 2 with respect to the outside sleeve 4 such as arises, for example, from the applications described referring to FIGS. 2 and 3, generating a longitudinal movement of the longitudinal shaft 2 with respect to the outside sleeve 4, is obtained by internal coupling means 5, i.e., owing to the threading of the internal rollers 25.

In an exemplary use, the first driving position of the ring 57 of the coupling means 56 may correspond to a current or standard operating mode of the actuating device 1.

To the extent that the external coupling means 6 may become defective, the electromagnetic elements 65 and 66 can then be activated in such a manner as to position the ring 57 of the coupling means 56 in its second driving position mentioned above to deactivate the external coupling means 6 and the internal coupling means and to thus move from its first operating position to its second operating position as mentioned above.

In another embodiment, such as illustrated in FIGS. 2 and 3, the coupling means 56 may be aborted and the coupling means may consist of relative differences between the helix angles of the threadings of the shaft, of the intermediate tailstock spindle and of the outside sleeve and/or the relative differences between the feed per revolution of the threadings of the shaft, of the intermediate tailstock spindle and of the outside sleeve.

In this other embodiment, the relative differences mentioned above can be customized so that the external coupling means 6 operate as a priority and that the internal coupling means 5 remain blocked by construction. In the event of the seizing or blocking of the external coupling means 6, the input or motor torque issued by the axis 47 of the motor 48 and applied to the outside sleeve 4 or issued by the axis 52 of the motor 53 and applied to the longitudinal shaft 2 exceeds a threshold determined by construction, the function of the load to be transmitted, such as the internal coupling means 5 take over and begin to operate.

The result of the preceding is that the coupling means 5 and 6 can, on the one hand, authorize a current or standard operating mode of the actuating device 1 and on the other, authorize a substitute operating mode or a fail-safe mode, mitigating a degradation of the operation of the first.

The actuating device 1 that has just been described may have various execution modes, which may also comprise coupling means performed by the coupling means such as the means 56 or performed by construction by using the relative differences mentioned above.

If we refer to FIG. 6, we can see that an actuating device 69 is illustrated which comprises a longitudinal shaft 70, an intermediate tailstock spindle and an outside sleeve 72.

Between the longitudinal shaft 70 and the intermediate tailstock spindle 71, internal coupling means 73 are envisaged that comprise an internal thread of longitudinal rollers 74 that are installed inversely when compared to the rollers 7 of the internal coupling means 5 of the actuating device in 1. It follows that, on the one hand, the threadings 75 of the rollers 74 and the external threading 76 of the longitudinal shaft 70 have identical helix angles and that, on the other, the threadings 75 of the rollers 74 and the internal threading 77 of the intermediate tailstock spindle 71 have different helix angles.

Thus, when the longitudinal shaft 70 turns with respect to the intermediate tailstock spindle 71, the rollers 74 pivot and roll around the longitudinal shaft 70 and into the intermediate tailstock spindle 71, without moving with respect to the longitudinal shaft 70 and while generating an axial movement of the longitudinal shaft 70 with respect to the intermediate tailstock spindle 71.

Between the intermediate tailstock spindle 71 and the outside sleeve 72, external coupling means 78 are envisaged that comprise an external threading of the longitudinal rollers 79 that are installed inversely to the rollers 25 of the external coupling means 6 of the actuating device 1. It follows that, on the one hand, the threadings 80 of the rollers 79 and the internal threading 81 of the outside sleeve 72 have identical helix angles and that on the other, the threadings 80 of the rollers 79 and the external threading 82 of the intermediate tailstock spindle 71 have different helix angles.

Thus, when the intermediate tailstock spindle 71 turns with respect to the outside sleeve 72, the rollers 79 pivot and roll around the intermediate tailstock spindle 71 and into the outside sleeve 72, without moving longitudinally with respect to the outside sleeve 72 and while generating an axial movement of the intermediate tailstock spindle 71 with respect to the outside sleeve 72.

In this embodiment illustrated in FIG. 6, the stroke of the shaft 70 with respect to the outside sleeve 72 is defined on the basis of the length of the internal threading 77 and on the basis of the length of the external threading 82 of the intermediate tailstock spindle 71.

In addition, the intermediate tailstock spindle 71 is fitted in one of its end sections, with a longitudinal guide ring that surrounds a smooth cylindrical portion of the intermediate tailstock spindle 71.

If we refer to FIG. 7, we can see that an actuating device 84 is illustrated that comprises a longitudinal shaft 85, an intermediate tailstock spindle 86 and an outside sleeve 87.

Between the longitudinal shaft 85 and the intermediate tailstock spindle 86, internal coupling means 88 are envisaged that correspond to the internal coupling means 5 of the actuating device 1.

Between the intermediate tailstock spindle 86 and the outside sleeve 87, external coupling means 89 are envisaged that correspond to the external coupling means 78 of the actuating device 69.

Thus, the stroke of the longitudinal shaft with respect to the outside sleeve 87 is defined on the basis of the length of the threading of the longitudinal shaft 85 and on the basis of the length of the external threading of the intermediate tailstock spindle 86.

In an embodiment not shown, inversely to that of FIG. 6, the internal coupling means 88 can be replaced by the internal coupling means 73 of the actuating device 69, and the external coupling means 89 may be replaced by the external coupling means 6 of the actuating device 1. In this case, the stroke of the longitudinal shaft 85 with respect to the outside sleeve 87 would be defined on the basis of the length of the internal threading of the intermediate tailstock spindle 86 and on the basis of the length of the internal threading of the outside sleeve 87.

In other versions of the operating mode, the internal means of coupling and/or the external means of coupling the actuating devices that have just been described, with meshed rollers and retainer clips, may be replaced by the internal coupling means and/or external coupling means with the recycling of rollers and/or the recycling of bearings.

If we refer to FIGS. 8 to 8e, we can see that an actuating device 90 in particular is illustrated, which comprises a longitudinal shaft 91, an intermediate tailstock spindle 92 and an outside sleeve 93.

Between the longitudinal shaft 91 and the intermediate tailstock spindle 92, internal coupling means 94 for recycling an internal threading of longitudinal rollers 74 which has threadings engaged with a threading of the longitudinal shaft 91 and an internal threading of the intermediate tailstock spindle 92.

Between the intermediate tailstock spindle 92 and the outside sleeve 93, external coupling means 96 for recycling of an external threading of longitudinal rollers 97, which has threadings engaged with an external threading of the intermediate tailstock spindle 92 and an internal threading of the outside sleeve 93.

As demonstrated more specifically, the FIGS. 8a, 8b and 8c, the intermediate tailstock spindle 92 carries guiding rings 98 and 99 internally 95 between which guidelines are provided by a circular guide channel. In order to ensure the recycling of the internal rollers 95, by means of turning in this guide channel, it may be advantageous, for example, for the intermediate tailstock spindle 92 to have an internal groove 100 and for the 98 and 99 rings to have inclined planes 101 and 102 arranged in such a manner in this circular channel that, when the longitudinal shaft 91 rotates with respect to the intermediate tailstock spindle 92, the internal rollers 95 pivot and successively jump from an internal thread pitch of the intermediate tailstock spindle 92 by passing into the longitudinal groove 100 and by being guided by the inclined planes 101 and 102 of the guiding rings 98 and 99.

As shown more specifically in the FIGS. 8a, 8d and 8e, the intermediate tailstock spindle 92 carries externally guiding rings 103 and 104 between which guidelines are provided by a circular guiding channel. In order to ensure the recycling of the external rollers 95, by turning in this circular channel, it may be advantageous, for example, for the intermediate tailstock spindle 92 to have an internal longitudinal groove 105 and for the rings 103 and 104 to have inclined planes 106 and 107 in this circular channel, arranged in such a manner that when the intermediate tailstock spindle 92 turns with respect to the outside sleeve 93, the external rings 97 pivot and successively jump longitudinally from an external thread pitch of the intermediate tailstock spindle 92 by passing into the longitudinal groove 105 and by being guided by the inclined planes 106 and 107 of the guiding rings 106 and 107.

In this example, the stroke of the longitudinal shaft 91 with respect to the outside sleeve 93 is defined by the length of internal threading the outside sleeve 93, the intermediate tailstock spindle 92 having the recycling means of the internal rollers 95 and recycling means of the external rollers 97.

If we refer to FIGS. 9a, 9b, and 9c, we can also see that an actuating device 108 is illustrated, which comprises a longitudinal shaft 109, an intermediate tailstock spindle 110 and an outside sleeve 111.

Between the longitudinal shaft 109 and the intermediate tailstock spindle 110, internal coupling means 112 are envisaged for recycling the internal threadings of the bearings 113, the longitudinal shaft 109 having a threading 114 and the intermediate tailstock spindle 110 having an internal threading 115, suitable for receiving these internal bearings 113, Between the intermediate tailstock spindle 110 and the outside sleeve 111, external coupling means 116 are envisaged for recycling the external threadings of bearings 117, the intermediate tailstock spindle 110 having a threading 118 and the outside sleeve 11 having a threading 119, suitable for receiving these external bearings 117.

As the FIGS. 9a and 9b show us more precisely, in order to ensure the recycling of the internal slugs 115, it may be advantageous, for example, for the internal slugs of the intermediate tailstock spindle 110 to have radial holes 120 configured on the two consecutive screw threads and deflection slugs 121 positioned and directed toward the inside of these holes 120, in such a way that the bearings 115 of each threading of bearings can be recycled during a turn by being deflected by the slugs 121 and by passing into the corresponding hole 120 and above the corresponding slug of the longitudinal shaft 109.

As shown more precisely by the FIGS. 9a and 9c, in order to ensure the recycling of the external bearings 117, it may be advantageous, for example, for the external slugs 118 of the intermediate tailstock spindle 110 to have radial holes 122 configured on two consecutive slugs and the deflecting slugs 123 positioned and directed toward the inside of these holes 122, in such a manner that the bearings 117 of each threading of bearings can be recycled during a turn by being deflected by the slugs 123 and by passing into the corresponding hole 122 and above the corresponding slug of the outside sleeve 111.

In this example, the stroke of the longitudinal shaft 109 with respect to the outside sleeve 111 is defined on the basis of the length of the threading of the longitudinal shaft 109 and on the basis of the length of the internal threading of the outside sleeve 111, the intermediate tailstock spindle 110 having the means to recycle the internal bearings 113 and the external bearings 117.

If we refer to FIG. 10, we can see that another actuating device 124 is illustrated that comprises a longitudinal shaft 124, an intermediate tailstock spindle 126 and an outside sleeve 127.

Between the longitudinal shaft 125 and the intermediate tailstock spindle 126, internal coupling means 128 are envisaged that no longer consist of the rolling elements in this example, but by a threading 129 provided on the longitudinal shaft 125, which is in direct contact with the internal threading 130 of the intermediate tailstock spindle 126.

Between the intermediate tailstock spindle 126 and the outside sleeve 127, external coupling means 131 with longitudinal rollers 132 are envisaged, which correspond with the external coupling means 131 with longitudinal rollers 132, which correspond to the external coupling means 6 of the actuating device 1 described above.

In this example, the stroke of the longitudinal shaft 125 with respect to the outside sleeve 127 is defined on the basis of the length of the threading 129 of the longitudinal shaft 125 and on the length of the internal threading 133 engaged with the threading of the rollers 132.

In an inverse operating method, the internal coupling means 128 could consist of the internal coupling means 5 of the actuating device 1 and the external coupling means 131 could consist of an external threading of the intermediate tailstock spindle 126 directly engaged with the internal threading 133 of the outside sleeve 127.

In other embodiment the coupling means 128 or 131, with intermediary connecting elements, could be replaced by any of those described based on FIGS. 6 to 9.

This invention is not limited to the examples described above.

The invention claimed is:

1. Actuating device comprising:
   a longitudinal shaft;
   an intermediate tailstock spindle positioned coaxially to and around the said shaft;
   an outside sleeve positioned coaxially to the said shaft and around the said intermediate tailstock spindle;
   internal thread coupling means making it possible to couple the longitudinal shaft and the intermediate tailstock spindle to generate an axial movement of one with respect to the other;
   external thread coupling means making it possible to couple the intermediate tailstock spindle and the outside sleeve and suitable for generating an axial movement of one with respect to the other;
   the said internal thread coupling means comprising internal roller elements engaged on the one hand with external and internal threading of the intermediate tailstock spindle and/or the said external thread coupling means comprising external roller elements engaged on the one hand with external threading of the intermediate tailstock spindle and internal threading of the outside sleeve; and
   selective coupling means making it possible to couple the shaft and the intermediate tailstock spindle or the intermediate tailstock spindle and the internal thread of the outside sleeve selectively while rotating.

2. Actuating device of claim 1, wherein said selective coupling means is such that for a given axial load to be transmitted, one of the said thread coupling means operates and the second does not operate or is blocked and that, when the input or drive torque, applied to the shaft or outside sleeve, exceeds a preset threshold determined on the basis of the load to be transmitted, the second of the said thread coupling means operates and the said first of said thread coupling means does not operate or is blocked.

3. Actuation device of claim 1, wherein the said internal thread coupling means comprises the said internal roller elements and the said external coupling means comprise an external thread of the intermediate tailstock spindle and an internal thread of the outside sleeve engaged with each other.

4. Actuation device of claim 1, wherein said external thread coupling means comprises the said external roller elements and the said internal thread coupling means comprises an external thread on the longitudinal shaft and an internal thread on the intermediate tailstock spindle engaged with each other.

5. Actuation device of claim 1, wherein said internal thread coupling means comprises the said internal roller elements and the said external thread coupling means comprises the said external roller elements.

6. Actuation device of claim 1, wherein the internal roller elements and/or the external roller elements comprise ball bearings located between internal and external threads, and said activation device further comprising means for circulating or repositioning said ball bearings.

7. Actuation device of claim 6, wherein the intermediate tailstock spindle comprises the said means of circulating or repositioning the said ball bearings.

8. Actuation device of claim 1, wherein the internal roller elements and/or the external roller elements comprise longitudinally threaded rollers engaged with the internal and external threads, and that they comprise means for circulating or repositioning said rollers.

9. Actuation device of claim 8, wherein the intermediate tailstock spindle comprises the said means for circulating or repositioning the said rollers.

10. Actuation device of claim 1, wherein the said internal roller elements comprise threaded longitudinal rollers, the helix angle of the thread of the rollers being either equal to the helix angle of the thread of the shaft and different from the helix angle of the internal thread of the intermediate tailstock spindle or equal to the helix angle of the internal thread of the intermediate tailstock spindle and different from the helix angle of the thread of the shaft.

11. Actuation device of claim 10, wherein the internal rollers comprise at least one annular section with gear teeth that are engaged either with the gear teeth of the shaft or with the gear teeth of the intermediate tailstock spindle.

12. Actuation device of claim 10, further comprising internal end bushes positioned on either side of the said internal rollers and has longitudinal holes in which the ends of these rollers and the means for forming axial end stops for the said bushes are respectively engaged.

13. Actuation device of claim 1, wherein the external thread coupling means comprises threaded longitudinal rollers, the helix angle of the thread of the rollers being either equal to the helix angle of the internal thread of the outside sleeve and different from the helix angle of the external thread of the intermediate tailstock spindle or equal to the helix angle of the external thread of the intermediate tailstock spindle and different from the helix angle of the internal thread of the outside sleeve.

14. Actuation device of claim 13, wherein the external rollers comprise at least one annular section with gear teeth that are either engaged with gear teeth of the outside sleeve or with gear teeth of the intermediate tailstock spindle.

15. Actuation device of claim 13, further comprising external bushes positioned on either side of the said external rollers and longitudinal holes in which the ends of these rollers and the means for forming axial end stops for the said bushes are respectively engaged.

16. Actuation device of claim 1, wherein the internal roller elements comprise longitudinally threaded rollers, the helix angle of the rollers being equal to the helix angle of the internal thread of the intermediate tailstock spindle and different from the helix angle of the thread of the shaft and that the external roller elements comprise longitudinally threaded rollers, the helix angle of the thread of the rollers being equal to the helix angle of the external thread of the intermediate tailstock spindle and different from the helix angle of the internal thread of the outside sleeve.

17. Actuation device of claim 16, wherein the internal rollers comprise at least one annular section with gear teeth that are engaged with the gear teeth of the intermediate tailstock spindle and that the external rollers comprise at least one annular section with gear teeth that are engaged with the gear teeth of the intermediate tailstock spindle.

18. Actuation device of claim 16, further comprising internal end bushes positioned on either side of the said internal rollers and has longitudinal holes in which the ends of these rollers and means for forming axial end stops for the said bushes are respectively engaged, as well as external end bushes positioned on either side of the external rollers and has longitudinal holes in which the ends of these rollers and the means for forming axial end stops for the said bushes are respectively engaged.

19. Actuation device of claim 1, wherein said selective coupling means comprise a coupling that makes it possible to block selectively in rotation either the shaft and the intermediate tailstock spindle, or the intermediate tailstock spindle and the outside sleeve.

20. Actuation device of claim 19, wherein said selective coupling means comprises a radially malleable ring, connected in rotation to the intermediate tailstock spindle and means acting on this ring to bring it selectively against the inner wall of the outside sleeve or against the outer wall of the shaft.

21. Actuation device of claim 19, wherein said selective coupling means comprises detection means for detecting torque and/or means for detecting rotation and/or means for detecting the axial load and/or means for detecting relative axial movement, as well as means for activating the said selective coupling means when the signal issued by said detection means exceeds a predetermined threshold.

22. Actuation device of claim 1, wherein said selective coupling means comprises relative differences between the helix angle of the threads of the shaft, of the intermediate tailstock spindle and of the outside sleeve and/or relative differences between the thread forms of the shaft, of the intermediate tailstock spindle and of the outside sleeve and/or relative differences between the pitch of the threads of the shaft, the intermediate tailstock spindle and the outside sleeve.

23. Actuation device of claim 1, further comprising means for guiding the outside sleeve with respect to the said longitudinal and/or means of guiding the intermediate tailstock spindle with respect to the outside sleeve and/or means of guiding the intermediate tailstock spindle with respect to the said longitudinal shaft.

24. Actuation device of claim 2, wherein the said internal thread coupling means comprises the said internal roller elements and the said external thread coupling means comprises an external thread of the intermediate tailstock spindle and an internal thread of the outside sleeve engaged with each other.

25. Actuation device of claim 2, wherein said external thread coupling means comprises the said external roller elements and the said internal thread coupling means comprises an external thread on the longitudinal shaft and an internal thread on the intermediate tailstock spindle engaged with each other.

26. Actuation device of claim 2, wherein said internal thread coupling means comprises the said internal roller elements and the said external thread coupling means comprises the said external roller elements.

* * * * *